J. W. CHAPMAN ET AL

Aug. 27, 1929. BEARING FOR LOCOMOTIVE TRUCKS AND THE LIKE Re. 17,419

Original Filed Nov. 24, 1926

J. W. Chapman,
J. J. Melley, INVENTORS
BY Victor J. Evans
ATTORNEY

P. J. Hickey.
WITNESS:

Reissued Aug. 27, 1929.

Re. 17,419

UNITED STATES PATENT OFFICE.

JOHN W. CHAPMAN, OF PARSONS, KANSAS, AND JOHN J. MELLEY, OF CHICAGO, ILLINOIS.

BEARING FOR LOCOMOTIVE TRUCKS AND THE LIKE.

Original No. 1,636,499, dated July 19, 1927, Serial No. 150,599, filed November 24, 1926. Application for reissue filed April 1, 1929. Serial No. 351,719.

The object of this invention is to provide a bearing for locomotive trucks and trailers, permitting of the use of hard oil or the like, and making it possible to dispense with the usual oil cellar,—increased bearing surface being provided, to effect the best results, and better lubrication afforded.

A further object is to provide for lubricating the bearing through a longitudinal bore in the axle.

A further object is to effect the result sought to be accomplished, by mounting in the box and within heavy metallic elements suitably machined, a cast iron bushing, this bushing surrounding a brass or bronze floating bushing apertured for the passage of lubricating material therethru, and having radial bores thru which the material is distributed from a central longitudinal bore in the axle.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1:
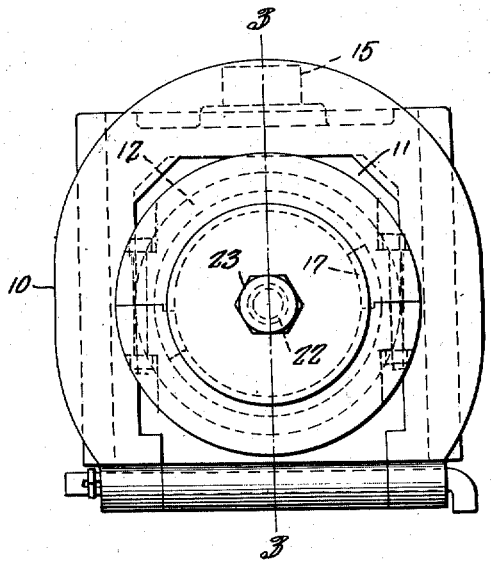
Figure 1 is a view of the box and bearing in elevation.
Figure 2:
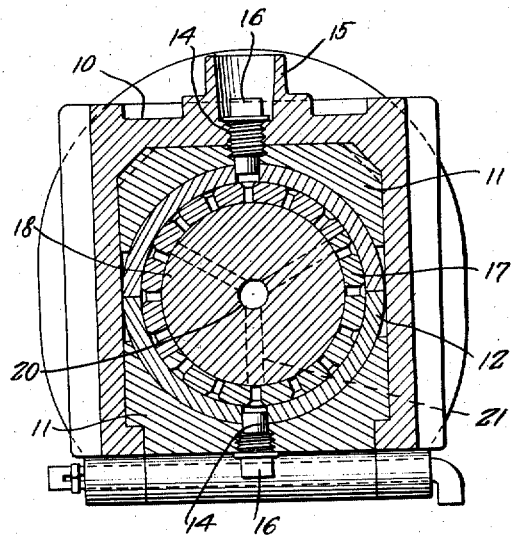
Figure 2 is a transverse vertical section, the section being on line 2—2 of Figure 3.

The box 10 has mounted therein heavy metallic elements or slabs such as 11, and a bushing 12 of cast iron, or Hunt Spiller bushing, is mounted within elements 11, the parts being machined to provide a correct fit.

Within the cast iron bushing 12, which is retained by threaded devices 14, we mount a further bushing adapted to surround the journal.

The elements 14 are inserted thru flanged bosses or the like, designated 15, and the ends of the elements 14 may be of angular form and are designated 16.

A brass or bronze floating bushing is shown at 17, and is provided with apertures thru which lubricating material may pass. This collar has a flange 17′ aiding in holding element 17 in position and acting as a hub liner.

The journal 18 is provided with a shoulder 18′ and a longitudinal bore 20 and with radial bores 21 thru which lubricating material may pass to the apertures of bushing 17, and into contact with the surfaces to be lubricated. The outer end of bore 20 is enlarged and receives a screw 22 adapted to be adjusted in accordance with the condition or bulk of the lubricating material, this screw having a head 23 and being retained in an adjusted position by a nut 24.

This construction has been found by a practical test to be especially satisfactory and efficient, and is designed to take the place of the construction in which lubrication is provided from the bottom. It is obvious that the metals or alloys employed may be varied, but they should have substantially the characteristics of those here mentioned by way of illustration.

Figure 3:
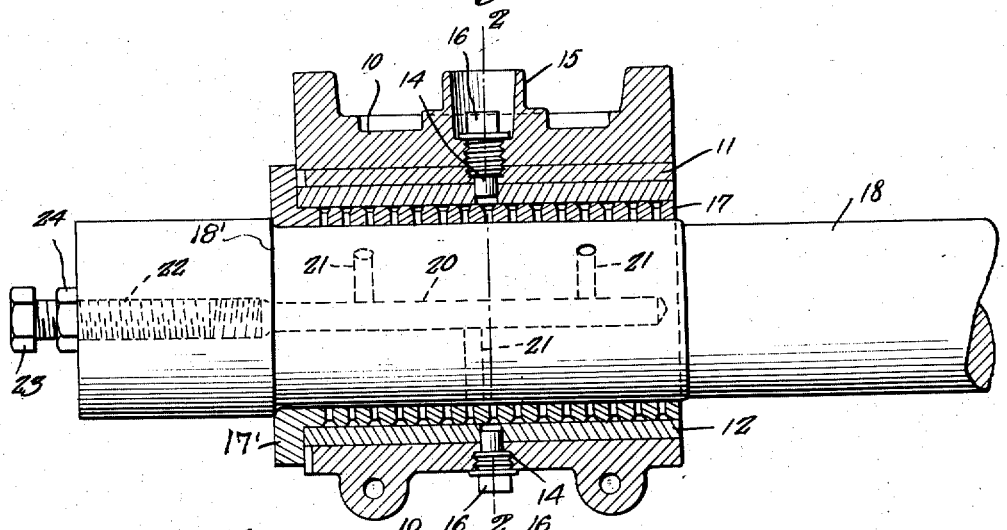
Figure 3 is a longitudinal section, this section being on line 3—3 of Figure 1.
Figure 4:
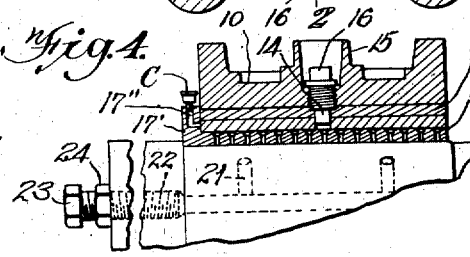
Figure 4 is a fragmentary view, in section, designed especially to show lubrication through the flange of the floating bushing, and constituting a slight modification.

In Figure 4 a slight modification is shown in which the flange of bushing 17 has a bore or duct 17″ thru which lubricating material passes from cup C to the inner side of the flange adjacent to the end of the bushing 12, of Figure 3.

What we claim is:

1. In an axle bearing for locomotives, a journal having a longitudinal bore and lateral ducts communicating with the longitudinal bore, an adjustable device for closing the outer end of the bore and controlling lubricating material within the bore and ducts, an apertured bushing surrounding said journal, a second bushing concentric with that first named, an outer structure, retaining devices extending through this structure into the second bushing, and means including upper and lower concave elements, receiving and mounting the second bushing within said outer structure, the apertured bushing including an outer flange extending over the end of the second bushing, and means engaging the flange on its outer side, said apertured bushing floating with reference to the second bushing.

2. In a locomotive axle bearing, a journal having a longitudinal bore and lateral ducts communicating with the longitudinal bore, an adjustable device for closing the outer end of the bore, an apertured bushing surrounding said journal, a second bushing concentric with that first named, mounting means, and radial devices extending through the mounting means into the second bushing, said apertured bushing including an outer flange, and means for lubricating the outer end portion of the second bushing through the flange.

3. A locomotive driving box bearing comprising a cylindrical rotatable bushing surrounding the journal, and a hub liner cast integral with the cylindrical bushing and positioned at the wheel end of the bearing.

4. A locomotive driving box bearing comprising a cylindrical rotatable bushing cast in halves, said bushing surrounding the journal, and a hub liner cast in halves and integral with the halves of the bushing, said hub liner positioned at the wheel end of the bearing.

5. An axle bearing for railway rolling stock comprising a cylindrical bushing surrounding the journal and rotatable thereon, and a hub liner cast integral with the cylindrical bushing and positioned at the wheel end of the bearing.

6. A railway journal box assembly comprising a box supported in the truck frame of rolling stock, a cylindrical rotating bushing surrounding the journal, and a removable filler block in the lower portion of the box occupying a space substantially equal to the diameter of the bushing, said block adapted to hold in position the cylindrical bushing surrounding the journal.

7. A railway journal box assembly comprising a box supported in the truck frame of rolling stock, a cylindrical rotating bushing surrounding the journal, a removable filler block in the lower portion of the box occupying a space substantially equal to the diameter of the bushing, said block adapted to hold in position the cylindrical bushing surrounding the journal, and means for lubricating the cylindrical bushing through the journal.

JOHN W. CHAPMAN.
JOHN J. MELLEY.